US011167863B2

(12) United States Patent
Ho et al.

(10) Patent No.: US 11,167,863 B2
(45) Date of Patent: Nov. 9, 2021

(54) UNMANNED AERIAL VEHICLE

(71) Applicant: XDynamics Limited, Hong Kong (HK)

(72) Inventors: Sai Hung Ho, Kowloon (HK); Man Wah Chan, Mid-Levels (HK)

(73) Assignee: XDynamics Limited, Kowloon (HK)

(*) Notice: Subject to any disclaimer, the term of this patent is extended or adjusted under 35 U.S.C. 154(b) by 385 days.

(21) Appl. No.: 16/343,296

(22) PCT Filed: Nov. 4, 2016

(86) PCT No.: PCT/CN2016/104535
§ 371 (c)(1),
(2) Date: Apr. 18, 2019

(87) PCT Pub. No.: WO2018/082004
PCT Pub. Date: May 11, 2018

(65) Prior Publication Data
US 2019/0256224 A1 Aug. 22, 2019

(51) Int. Cl.
B64D 47/08 (2006.01)
B64C 39/02 (2006.01)
(Continued)

(52) U.S. Cl.
CPC ............ B64D 47/08 (2013.01); B64C 39/024 (2013.01); G03B 15/006 (2013.01);
(Continued)

(58) Field of Classification Search
USPC ...................................................... 244/17.23
See application file for complete search history.

(56) References Cited

U.S. PATENT DOCUMENTS 10,917,561 B2* 2/2021 Huang ................... B64C 39/024
11,034,446 B2* 6/2021 Tang ...................... B64D 47/08
(Continued)

FOREIGN PATENT DOCUMENTS

CN 204433078 U 7/2015
CN 105882994 A 8/2016
CN 106029502 A 10/2016

OTHER PUBLICATIONS

ISR and Written Opinion, PCT/CN2016/104535, XDynamics Limited, dated Jul. 27, 2017.
Translations of Abstracts of CN references, were not filed.

*Primary Examiner* — Clayton E. LaBalle
*Assistant Examiner* — Warren K Fenwick

(57) ABSTRACT

The invention relates to an unmanned aerial vehicle (UAV). The UAV comprises a body housing control and wireless communication circuitry for the UAV and a rechargeable power source. The UAV has a plurality of propellers surrounding the body and supported so as to be spaced outwardly from and preferably above the body. A gimbal is mounted under a forward portion of the body for supporting a camera. The gimbal may be arranged under the forward portion of the body such that an angle of a forward vertical field of view of the camera is less than an angle of a forward vertical clearance field of view defined with respect to a forward tip of at least one of the propellers. The gimbal may be arranged under the forward portion of the body such that a lens of a camera supported thereon is substantially in line with a front edge of the UAV body.

14 Claims, 6 Drawing Sheets

(51) Int. Cl.
　　　*G03B 15/00*　　　(2021.01)
　　　*G03B 17/56*　　　(2021.01)
(52) U.S. Cl.
　　　CPC ...... *G03B 17/561* (2013.01); *B64C 2201/108* (2013.01); *B64C 2201/127* (2013.01)

(56) References Cited

U.S. PATENT DOCUMENTS

| | | | |
|---|---|---|---|
| 2015/0344136 A1* | 12/2015 | Dahlstrom | B64C 39/024 |
| | | | 701/3 |
| 2016/0144954 A1* | 5/2016 | Daigle | B64C 39/024 |
| | | | 244/17.23 |
| 2016/0311544 A1 | 10/2016 | Phan et al. | |
| 2017/0043870 A1* | 2/2017 | Wu | B64C 1/30 |
| 2018/0118322 A1* | 5/2018 | Harris | B64C 39/024 |
| 2018/0354625 A1* | 12/2018 | Verkade | B64C 39/024 |
| 2019/0039743 A1* | 2/2019 | Tanriover | E05B 81/08 |
| 2019/0061970 A1* | 2/2019 | Wang | H02N 11/002 |
| 2019/0144115 A1* | 5/2019 | Chen | B64C 25/32 |
| | | | 244/118.1 |
| 2019/0375510 A1* | 12/2019 | Qiu | B64D 27/24 |

\* cited by examiner

UNMANNED AERIAL VEHICLE

This is a US national phase entry patent application claiming priority to PCT application No. PCT/CN2016/104535 filed 4 Nov. 2016, which is incorporated herein for all purposes.

FIELD OF THE INVENTION

The invention relates to a configuration of a drone such as an unmanned aerial vehicle (UAV), and particularly, but not exclusively, to a configuration of a UAV such as a multi-copter.

BACKGROUND OF THE INVENTION

There has been a rapid development in the field of unmanned vehicles and particularly, in the technology of unmanned aerial vehicles (UAVs) such as multi-copters and drones. A conventional UAV may comprise one or more propellers controlled by a flight control computer having one or more controllers and/or sensors.

A drone or multi-copter is a rotorcraft normally with more than two rotors. An advantage of a multi-rotor aircraft is the simpler rotor mechanics required for flight control. Unlike single- and double-rotor helicopters which typically use complex variable pitch rotors whose pitch varies as the blade rotates for flight stability and control, multi-rotors use fixed-pitch blades. Consequently, control of vehicle motion is achieved by varying the relative speed of each rotor to change the thrust and torque produced by each rotor.

UAVs are increasingly being used to shoot professional quality moving images. Usually, the camera supported on the UAV is controllable to rotate, pitch and yaw relative to the UAV body to capture action scenes or the like. Such camera movements may be controlled manually or may be programmed in advance. In most conventional UAVs, the camera is supported generally under the centre of the UAV body as this normally comprises the UAVs centre of gravity or centre of balance. However, this severely limits the degree or range of camera movements if wishing to avoid compromising captured images by capturing images of parts of the UAV structure.

OBJECTS OF THE INVENTION

An object of the present invention is to provide a novel unmanned aerial vehicle such as a multi-copter or drone.

Another object of the present invention is to mitigate or obviate to some degree one or more problems associated with known unmanned aerial vehicles, or at least to provide a useful alternative.

The above objects are met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides an unmanned aerial vehicle (UAV). The UAV comprises a body housing control and wireless communication circuitry for the UAV and a rechargeable power source. The UAV has a plurality of propellers surrounding the body and supported so as to be spaced outwardly from and preferably above the body. A gimbal is mounted under a forward portion of the body for supporting a camera. The gimbal is arranged under the forward portion of the body such that an angle of a forward vertical field of view of the camera is less than an angle of a forward vertical clearance field of view defined with respect to a forward tip of at least one of the propellers. The gimbal is preferably also arranged such that an angle of a forward horizontal field of view of the camera is substantially less than an angle of a forward horizontal clearance field of view defined with respect to a forward tip of at least one of the feet.

In a second main aspect, the invention provides an unmanned aerial vehicle (UAV) comprising a body, a plurality of propellers surrounding the body and supported so as to be spaced outwardly from the body and a gimbal mounted under a forward portion of the body for supporting a camera. The gimbal is arranged such that a lens of a camera supported thereon is substantially in line with a front edge of the UAV body.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which.

DESCRIPTION OF PREFERRED EMBODIMENTS

Figure 1:
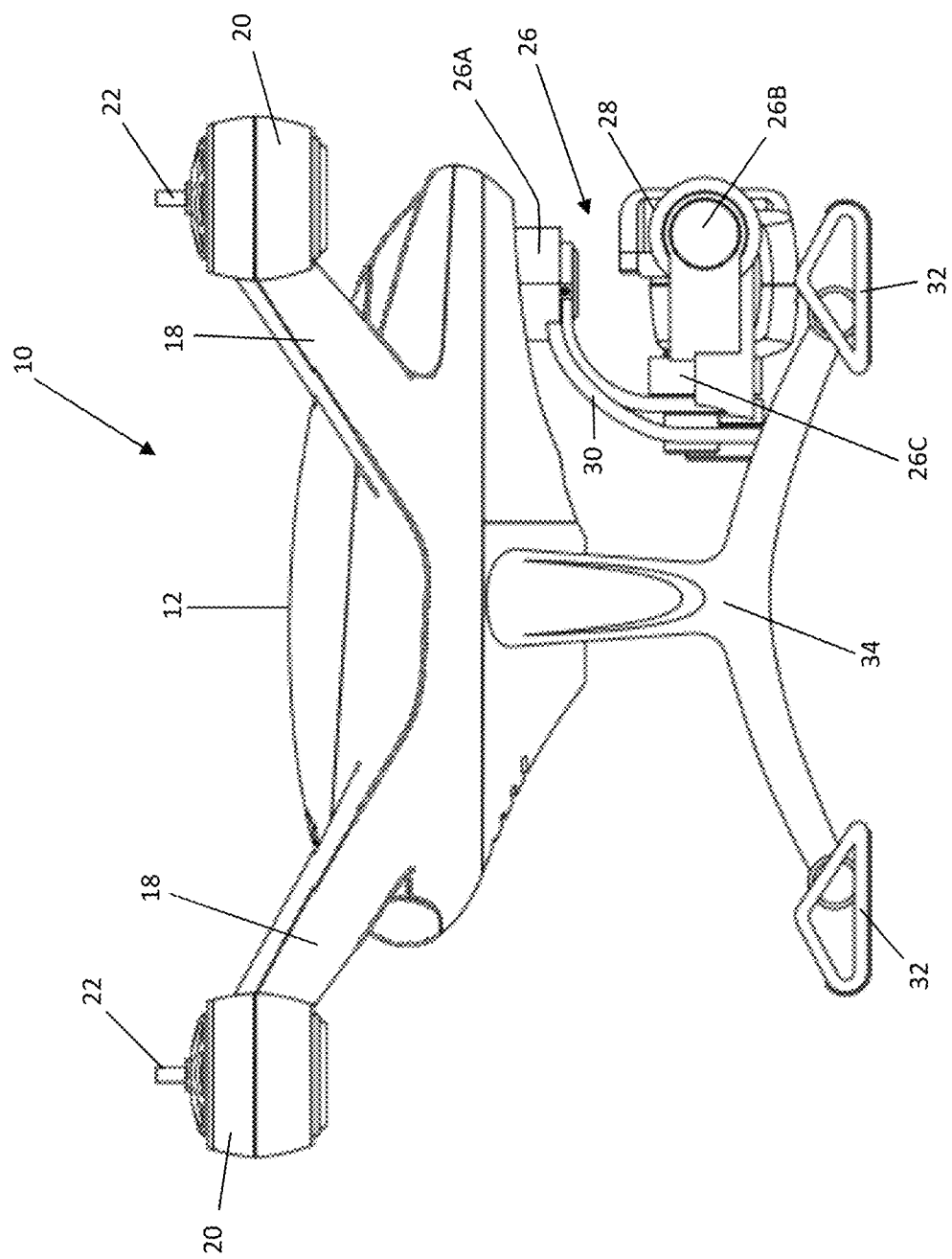
FIG. 1 is a side view of a UAV in accordance with an embodiment of the invention, but not including propellers.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the following description, embodiments of a drone or multi-copter are described by way of example of an unmanned aerial vehicle (UAV), particularly a small-sized UAV having a weight up to about 40 kg, although this is not a limiting weight size.

Referring to the drawings, there is provided a UAV 10 having a body 12 housing at least control circuitry 13, wireless communication circuitry 14 and a rechargeable power source 16 (FIG. 2) for the UAV 10. The operation of the UAV 10 may be controlled wirelessly from a ground station (not shown) or it may operate automatically according to preprogrammed control instructions uploaded to its control circuitry 13. A main part of the body 12 is preferably generally egg-shaped, although it will be understood that the shape of the UAV body may take any suitable form. An advantage of an egg-shaped body 12 is that it is generally aerodynamically efficient whilst providing sufficient volume to house internal components 13, 14, 16 of the UAV 10. Furthermore, it provides a strong structural platform for supporting arms 18 for the UAV propellers.

As can be seen from the drawings, the UAV 10 has a plurality of arms 18 extending outwardly from the body 12. Preferably, the arms 18 are also inclined upwardly with respect to the body 12. Preferably the arms 18 are inclined upwardly with respect to the horizontal in a range from 20 to 30 degrees and more preferably at 25 degrees. In the embodiment shown, there are four arms 18, but the number of arms may vary for other embodiments according to the invention. At the end of each arm is provided a motor 20 having a rotor 22 on which is mounted a propeller 24. The arms 18 preferably extend outwardly and upwardly from the body 12 such that a majority of an area A (FIG. 4) swept by a propeller 24 is substantially unimpeded by the main body part of the UAV body 12, i.e. the downward airflow of a propeller 24 is not significantly blocked by other structural parts of the UAV 10 such as the egg-shaped body 12. The arms 18 are arranged around the body 12 such that they surround the body 12 and such that the areas A swept by the propellers 24 are closely adjacent to one another. The arms 18 are preferably integrally formed with the body 12.

A gimbal 26 is mounted under a forward portion of the body 12 for supporting a camera 28. The gimbal 26 comprises a first motor 26A for moving the camera 28 about a vertical axis, i.e. to effect yaw movements of the camera 28 with respect to the UAV body 12. The first motor 26A is mounted to the UAV body 12. The gimbal 26 includes a second motor 26B for moving the camera vertically about a horizontal pitch axis, i.e. to effect movement of the camera 28 about a horizontal axis that is normal to a forward direction of movement of the UAV 10 when the camera 28 is itself pointing in said forward direction of the UAV 10. The gimbal has a third motor 26C for effecting movement of the camera 28 about a horizontal axis aligned with the forward direction of motion of the UAV 10 when the camera is pointing in said forward direction. Consequently, the gimbal 26 enables the camera 28 to be moved with three degrees of freedom relative to the UAV body 12. The forward or front portion of the UAV body 12 preferably comprises the front 25% of the UAV body 12.

The gimbal 26 includes a gimbal arm 30 which connects at a first end to the first motor 26A at the forward part of the body 12 and extends downwardly and rearwardly from said point of connection. A second end of the gimbal arm 30 mounts the second and third motors 26B, 26C and the camera 28. Consequently, the camera 28 is mounted in front of the arm 30 and an image view of the camera is always unimpeded by said arm 30. The arm 30 is preferably curved. The arm 30 may also carry electrical connections between the camera 28 and the second and third motors 26B, 26C and the internal components 13, 14, 16 housed in the UAV body 12. The camera 28 is preferably permanently connected to the gimbal 26. As such, the camera 28 is preferably designed specifically for matched operation with the UAV 10. This has at least the advantage that the characteristics such as the weight of the camera 28 are known when the UAV 10 is being designed such that the internal components 13, 14, 16 housed within the UAV body can be arranged so as to counterbalance the displacement of the camera 28 forward of a centre point of the UAV 10 which would normally comprise the UAVs centre of gravity. In some embodiments of a UAV according to the invention, knowing the weight of the camera enables not only the internal components housed in the body of the UAV to be arranged to counterbalance the forward placement of the camera, but to enable even the positioning of structural components such as the arms 18 to be arranged to provide some counterbalancing of the forward placement of the camera 28. The gimbal 26 is preferably arranged such that a lens 28A of the camera is substantially in line with a front edge of the UAV body 12, although, in some embodiments, the camera may be positioned with its lens 28A forward of the front edge of the UAV body 12.

Displacing the camera 28 forward of the centre of the UAV body and below or lower than the UAV body 12 considerably reduces the likelihood of the camera image view being obstructed by structural components of the UAV such as the propeller arms 18 or even the propellers 24. The forward placement of the camera 28 under the UAV body 12 greatly increases the range or degree of camera movements to capture images cleanly and without obstruction.

Figure 2:
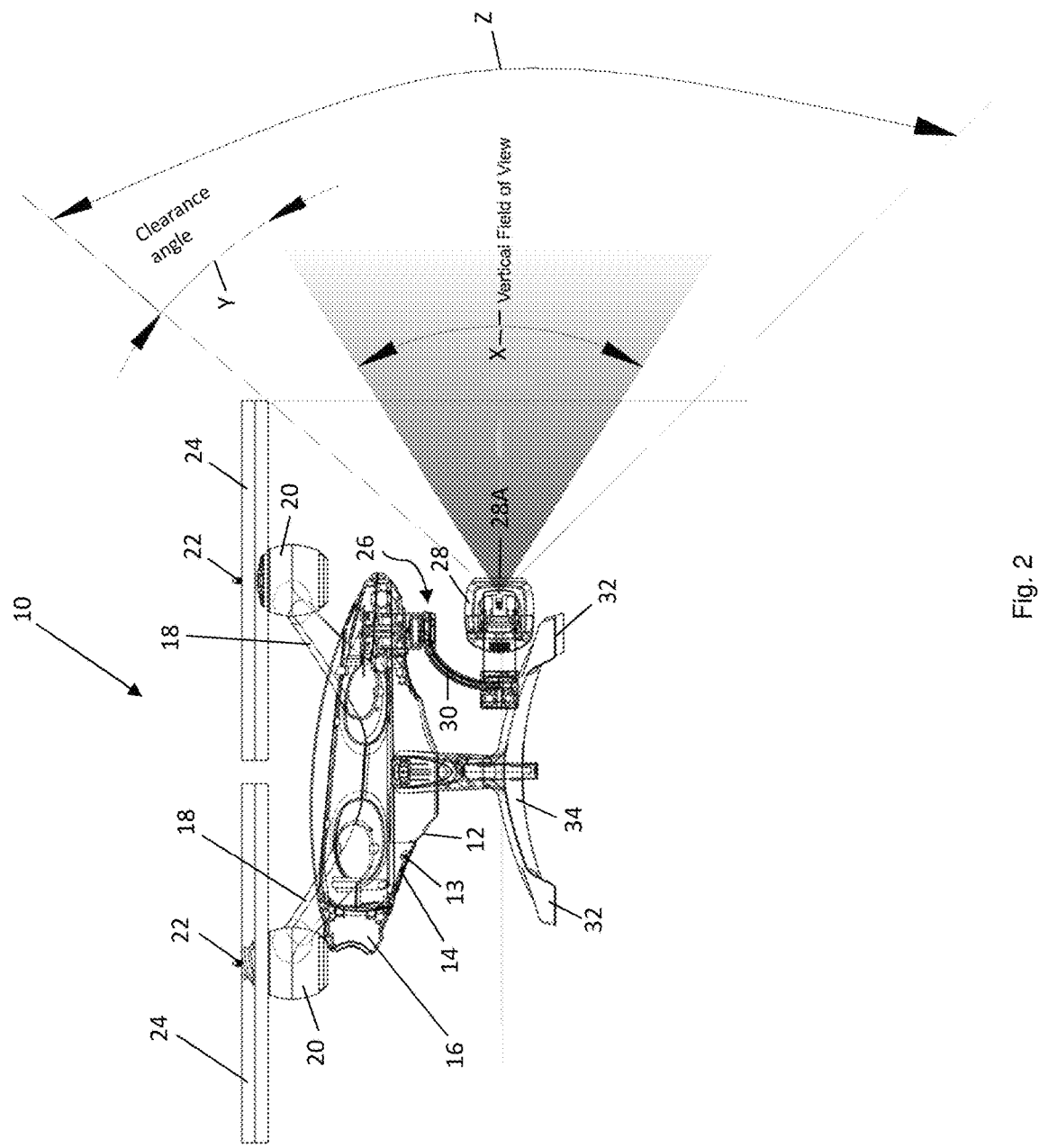
FIG. 2 is a side-sectional view of the UAV of FIG. 1, but including propellers.

Referring particularly to FIG. 2, it can be seen that the gimbal 26 is arranged under the forward portion of the body 12 such that an angle of a forward vertical field of view X of the camera 28 is less than an angle of a forward vertical clearance field of view Z defined with respect to a forward tip or forward-most extent of at least one of the propellers 24. A clearance angle Y comprising a difference on one side between the forward vertical clearance field of view angle Z and the camera forward vertical field of view angle X is preferably equal to or greater than a pitch angle of the camera on one side relative to the UAV body or the pitch angle of the UAV in forward motion. In stable even flight, the camera 28 can be pitched up by as much as the clearance angle Y before the image view is impeded to any degree by one of the UAV's forward propellers 24. In the embodiment shown, the camera 28 can be pitched down by an angle greater than the clearance angle, because the forward placement of the camera 28 on the UAV 10 is such that the camera is generally forward of any structural components of the UAV 10 lower than the normal field of view X of the camera 28. The issue of obstruction by the forward propellers is more acute when the UAV 10 is moving forward at speed such that the UAV 10 itself is pitched downwardly at its front to obtain stable flight at speed. In such a case, the UAV 10 can be considered as having been pitched downwardly relative to the camera 28 (the camera 28 is pitched upwardly relative to the downwardly pitched UAV 10 to maintain its normal forward directed field of view X) by an amount as much as the clearance angle Y without obstructing the image view of the camera 28. It will be understood that forward motion of the UAV 10 will be relative to the surrounding air rather than relative to land. It will also be understood that the degree of pitch required during forward motion of the UAV 10 is dependent on the velocity of the UAV 10 relative to the surrounding air. The novel arrangement of the UAV 10 as disclosed herein enables moving images to be captured by a UAV travelling forward at a predetermined velocity relative to air whilst the UAV 10 is pitched downwardly for forward motion and yet not have the rotating forward propellers 24 obstruct the normal forward vertical image view X of the camera 28. It will also be understood that references to the angle of a forward vertical field of view X of the camera 28 is reference to a maximum value of said camera forward vertical field of view angle.

The clearance angle Y may be as much as 19 degrees. The forward vertical field of view X of the camera 28 may be as much as 64 degrees.

The UAV preferably has one or more feet 32 extending below the UAV body 12 and the gimbal 26. In the embodiment as shown, there are four feet 32 provided on two Y-shaped members 34 which extend downwardly and outwardly away from respective sides of the UAV body 12. Preferably, the Y-shaped members 34 are formed integrally with the UAV body 12. Preferably, the Y-shaped members 34 respectively connect to the UAV body 12 at centre points on respective sides of the body 12. Consequently, the main structures of the Y-shaped members 34 save for the forward feet 32 are placed behind the gimbal 26 and camera 28. The arrangement of the Y-shaped members 34 is such that the camera 28 may be rotated to shoot images to the rear of the UAV 10 when in forward flight having a generally unobstructed field of view backwards between the Y-shaped members 34. From a bottom plan view of the UAV 10, the two Y-shaped members 34 define an H-shape from front to back of the UAV 10 thereby leaving free from obstruction the space under the UAV body 12.

Figure 3:
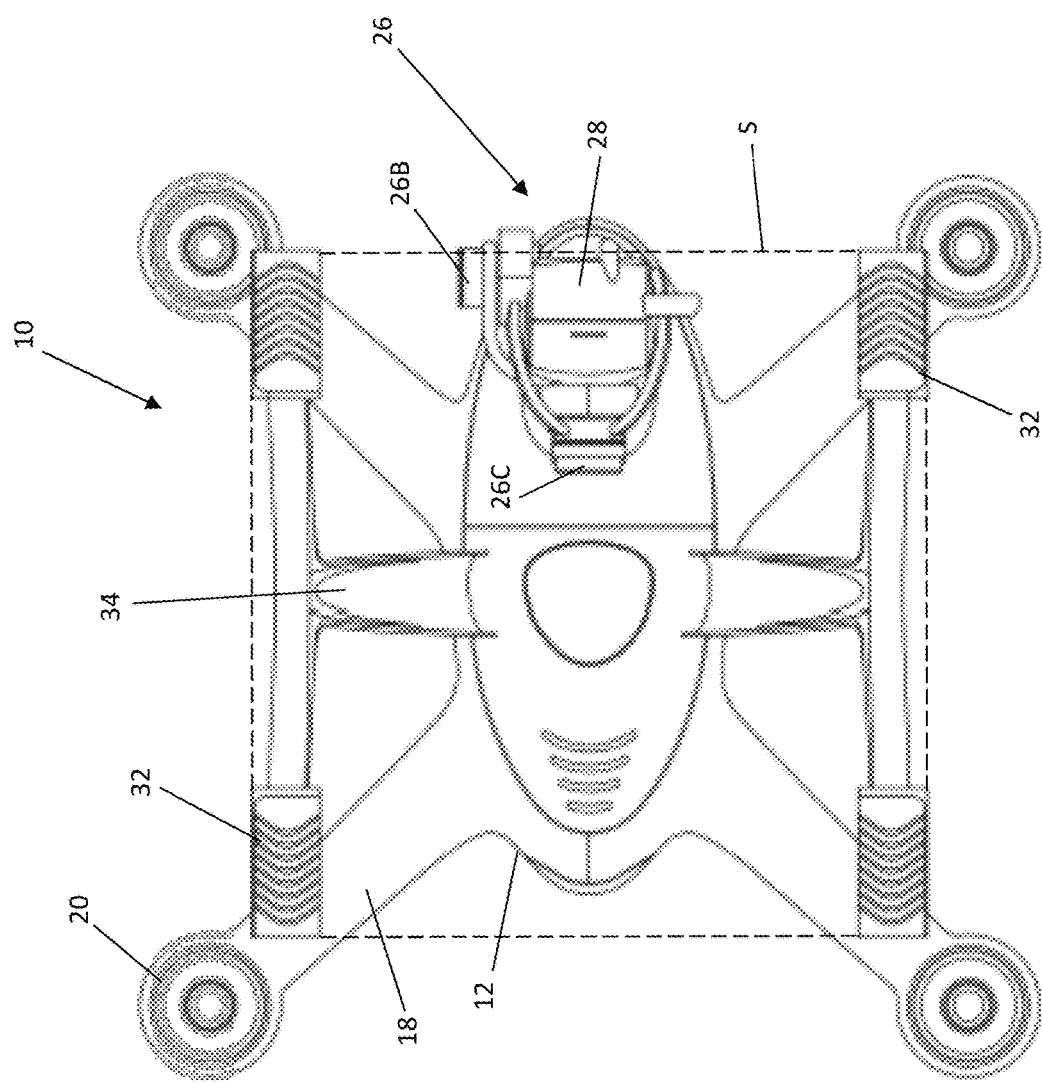
FIG. 3 is a plan view from below of the UAV of FIG. 1.

The outer edges of the feet 32 define an imaginary square S (shown by dashed line S in FIG. 3) which provides a very stable landing support for the UAV 10. Preferably, the motor rotors 22 are positioned beyond said imaginary square S.

Figure 4:
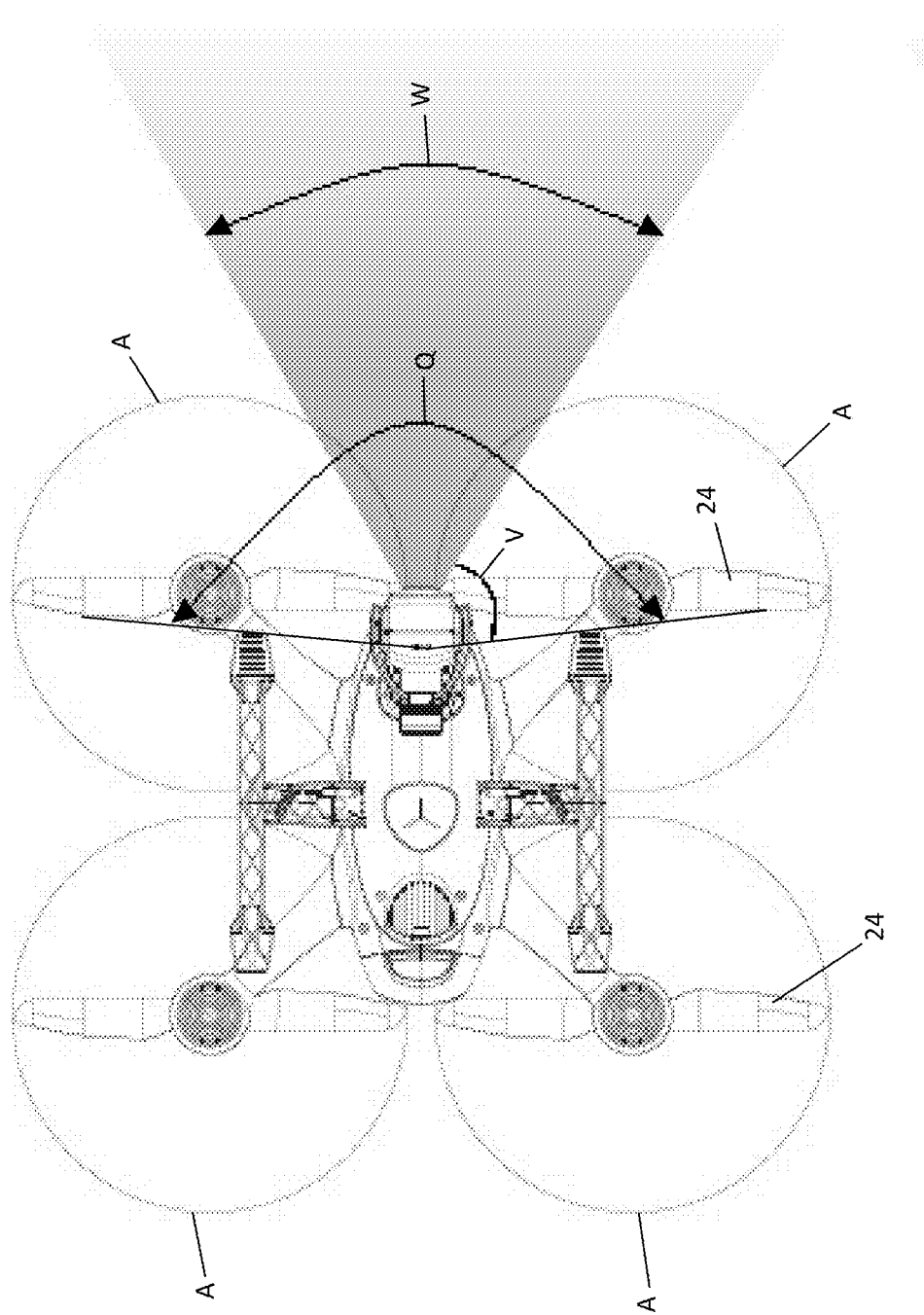
FIG. 4 is a plan view from below of the UAV of FIG. 1, but including propellers.
Figure 5:
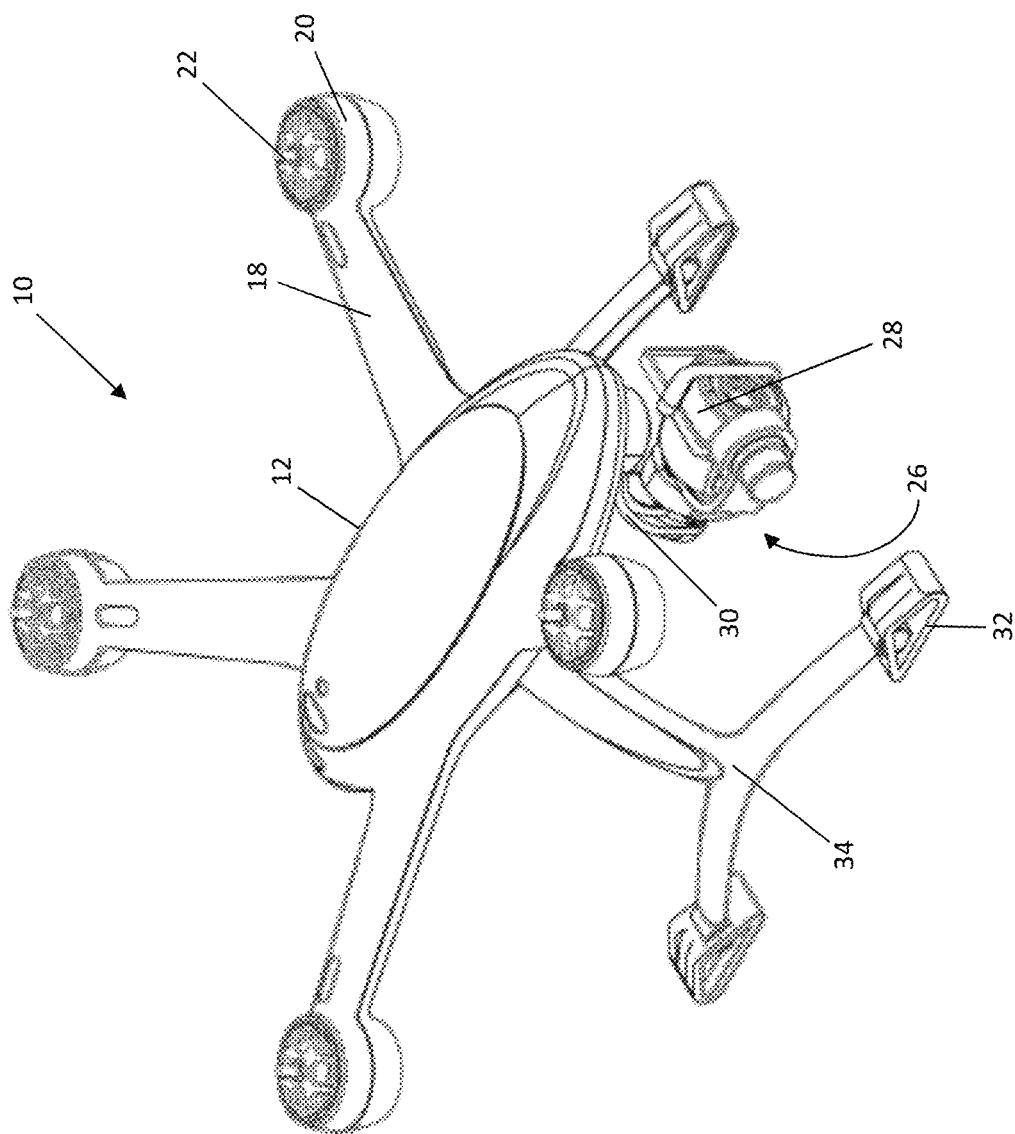
FIG. 5 is a perspective view from above of the UAV of FIG. 1, but not including propellers.
Figure 6:
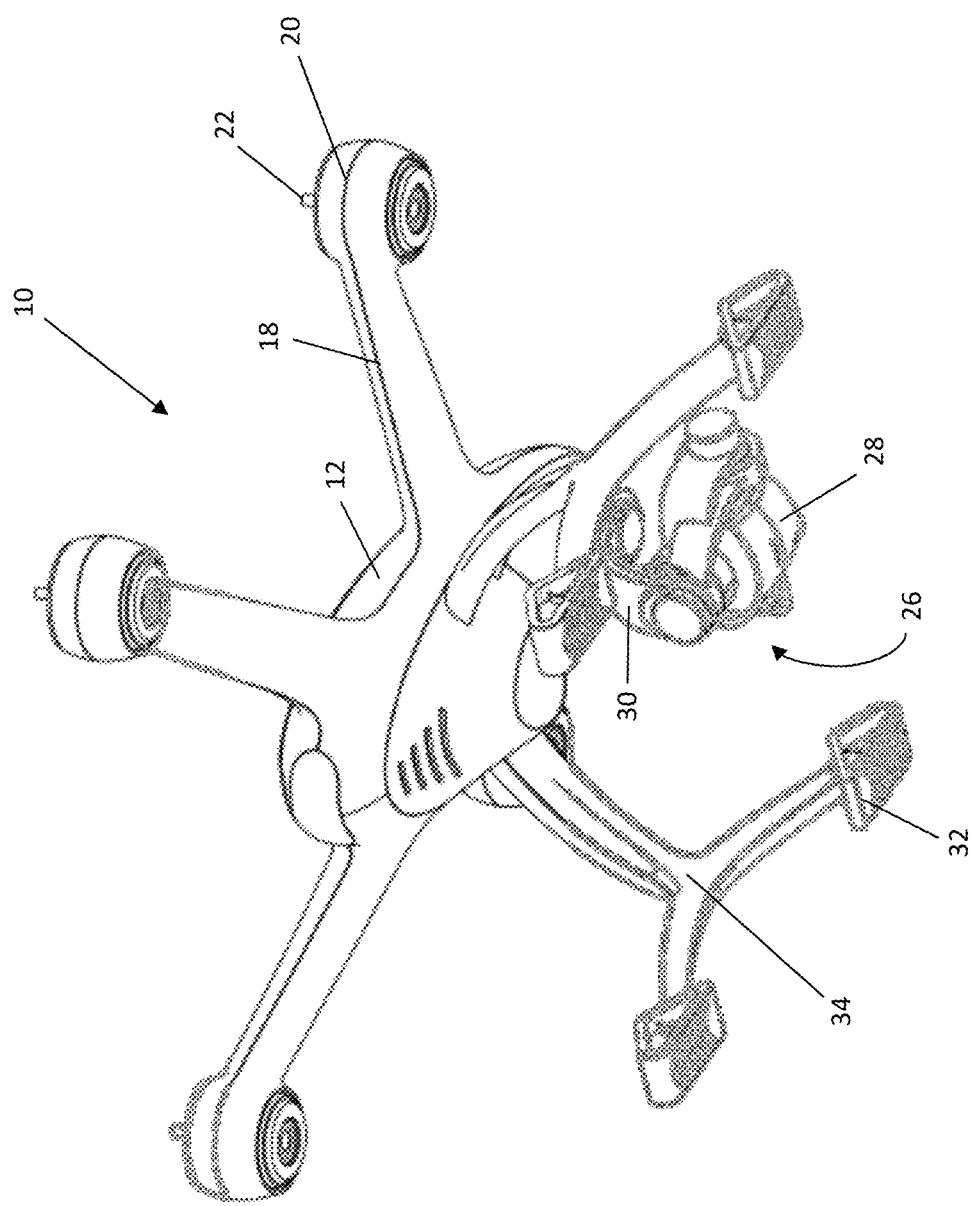
FIG. 6 is a perspective view from below of the UAV of FIG. 1, but not including propellers.

Referring particularly to FIG. 4, the forward placement of the camera 28 on the UAV 10 is such that an angle of a forward horizontal field of view W of the camera is substantially less than an angle of a forward horizontal clearance field of view Q (FIG. 4) defined with respect to a forward edge or tip of at least one of the feet 32. As such, the camera 28 can be rotated to both sides in the horizontal field of view by a significant degree without its image view being obstructed by structural or other components of the UAV 10. The camera 28 can be rotated to both sides in the horizontal field of view by as much as 57 degrees without its image view being obstructed by structural or other components of the UAV 10. Consequently, a difference between the forward horizontal clearance field of view angle Q and the camera forward horizontal field of view angle W is equal to or greater than a yaw angle of the camera 28 provided by gimbal motor 26A. At least the lens 28A of the camera 28 is positioned forward of the front feet 32 of the UAV 10.

The forward placement of the camera 28 on a gimbal 26 supported below a front portion of the UAV body 12 is such that it enables a synergistic combination of at least pitch and yaw degrees of freedom of movement of the camera 28 when the UAV is in flight without the camera image view becoming obstructed by structural or other component parts of the UAV 10. This enables the UAV camera 28 to be operated to take high quality action scene moving images whilst in flight and whilst travelling at speed.

In general, the invention relates to an unmanned aerial vehicle (UAV). The UAV comprises a body housing control and wireless communication circuitry for the UAV and a rechargeable power source. The UAV has a plurality of propellers surrounding the body and supported so as to be spaced outwardly from and preferably above the body. A gimbal is mounted under a forward portion of the body for supporting a camera. The gimbal may be arranged under the forward portion of the body such that a lens of a camera supported thereon is substantially in line with a front edge of the UAV body. The gimbal may be arranged under the forward portion of the body such that an angle of a forward vertical field of view of the camera is less than an angle of a forward vertical clearance field of view defined with respect to a forward tip of at least one of the propellers. The gimbal is preferably also arranged such that an angle of a forward horizontal field of view of the camera is substantially less than an angle of a forward horizontal clearance field of view defined with respect to a forward tip of at least one of the feet.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such prior art does not constitute an admission that the prior art forms a part of the common general knowledge in the art.

The invention claimed is:

1. An unmanned aerial vehicle (UAV) comprising:
a body;

a plurality of propellers surrounding the body and supported so as to be spaced outwardly from the body;

a gimbal mounted under a forward portion of the body for supporting a camera;

wherein the gimbal is arranged under the forward portion of the body such that an angle of a forward vertical field of view of the camera is less than an angle of a forward vertical clearance field of view defined with respect to a forward tip of at least one of the propellers.

2. The UAV according to claim 1, wherein a difference between the forward vertical clearance field of view angle and the camera forward vertical field of view angle is equal to or greater than a pitch angle of the camera relative to the UAV body or of the UAV in forward motion.

3. The UAV according to claim 1, wherein a difference between the forward vertical clearance field of view angle and the camera forward vertical field of view angle is equal to or greater than a pitch angle of the UAV in forward motion for the UAV moving forward at a predetermined velocity relative to air.

4. The UAV according to claim 1, wherein the plurality of propellers surrounding the body are supported so as to be spaced outwardly from and above the body of the UAV.

5. The UAV according to claim 1, wherein the gimbal is arranged such that a lens of a camera supported thereon is substantially in line with a front edge of the UAV body.

6. The UAV according to claim 1, wherein internal components of the UAV housed in the body are arranged so as to counterbalance the forward mounted gimbal and a camera supported by the gimbal.

7. The UAV according to claim 1, wherein an arm supporting the gimbal to the body of the UAV extends rearwardly and downwardly from a point of connection to the body such that a camera is supported on the gimbal in front of the supporting arm.

8. The UAV according to claim 1, wherein the UAV has one or more feet extending below the body and the gimbal.

9. The UAV according to claim 8, wherein an angle of a forward horizontal field of view of the camera is substantially less than an angle of a forward horizontal clearance field of view defined with respect to a forward tip of at least one of the feet.

10. The UAV according to claim 9, wherein a difference between the forward horizontal clearance field of view angle and the camera forward horizontal field of view angle is equal to or greater than a yaw angle of the camera.

11. The UAV according to claim 1, wherein the camera is permanently connected to the gimbal.

12. The UAV according to claim 11 when dependent on claim 6, wherein the permanently connected camera combined with the gimbal are counterbalanced by the internal components arranged within the UAV body.

13. An unmanned aerial vehicle (UAV) comprising:

a body;

a plurality of propellers surrounding the body and supported so as to be spaced outwardly from the body;

a gimbal mounted under a forward portion of the body for supporting a camera;

wherein the gimbal is arranged such that a lens of a camera supported thereon is substantially in line with a front edge of the UAV body.

14. The UAV according to claim 13, wherein the gimbal is arranged under the forward portion of the body such that an angle of a forward vertical field of view of the camera is less than an angle of a forward vertical clearance field of view defined with respect to a forward tip of at least one of the propellers.

* * * * *